United States Patent [19]

Herbenar

[11] 4,158,511
[45] Jun. 19, 1979

[54] PIVOT JOINT

[75] Inventor: Edward J. Herbenar, Birmingham, Mich.

[73] Assignee: TRW Inc., Cleveland, Ohio

[21] Appl. No.: 926,521

[22] Filed: Jul. 19, 1978

Related U.S. Application Data

[63] Continuation of Ser. No. 837,395, Sep. 28, 1977.

[51] Int. Cl.² ........................ F16C 11/00; F16D 1/12
[52] U.S. Cl. .................................. 403/113; 403/225; 403/228; 308/238
[58] Field of Search ............... 403/112, 113, 117, 120, 403/132, 145, 147, 149, 164, 221, 224, 225, 226, 372; 308/26, 161, 238; 280/95; 267/57.1, 153, 154

[56] References Cited

U.S. PATENT DOCUMENTS

| | | | |
|---|---|---|---|
| 1,964,432 | 6/1934 | Geyer | 403/226 X |
| 2,855,232 | 10/1958 | Kozak | 403/226 X |
| 2,981,573 | 4/1961 | Reuter | 308/238 X |
| 3,282,602 | 11/1966 | Willingshofer et al. | 403/226 X |
| 3,329,453 | 7/1967 | Patton | 403/221 |
| 3,746,415 | 7/1973 | Thomson | 308/238 X |
| 3,944,376 | 3/1976 | Hata | 403/132 |
| 4,057,304 | 11/1977 | Gaines et al. | 308/238 X |

*Primary Examiner*—Wayne L. Shedd

[57] ABSTRACT

An improved pivot joint has a rotatable and tiltable stud. A rotational preload force is applied to the stud by a bearing which is circumferentially stressed in tension to apply a clamping force to the stud. This clamping force resists rotation of the stud relative to a housing until a predetermined minimum rotational force is applied to the stud. A tilting or sidewise preload force is applied to the stud by a resiliently compressible bushing which is disposed between the bearing and the housing. Since the tilting preload force is applied to the stud by the bushing, the bearing can be designed to provide an optimum rotational preload force without regard to tilting preload force design considerations. Similarly, the bushing can be designed to provide optimum tilting preload forces without regard to design considerations influenced by the rotational preload forces. The pivot joint is advantageously assembled by resiliently expanding the bearing, moving the stud into alignment with the bearing then releasing the bearing so that it contracts part way back to its initial condition. The diameter of the stud surface engaged by the bearing is large enough so that the bearing cannot fully retract back to its initial condition. This results in tension stresses being set up in the bearing so that it applies a clamping force against the stud to hold it against rotation. In one embodiment of the invention the bearing is provided with projections which limit sideward tilting movement of the stud.

13 Claims, 9 Drawing Figures

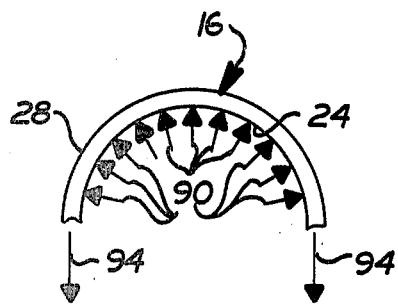
FIG.5
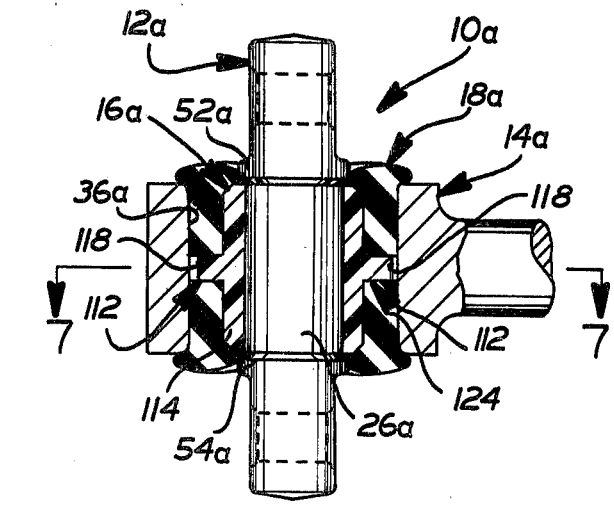
FIG.6
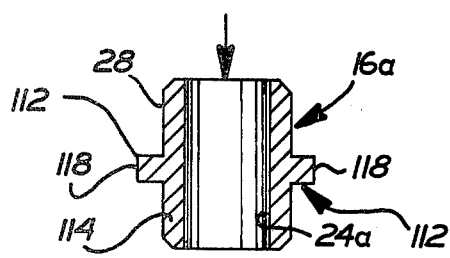
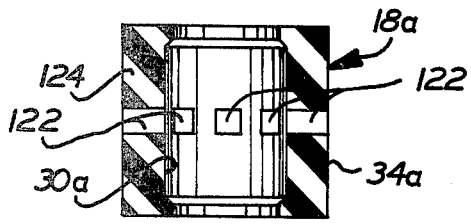
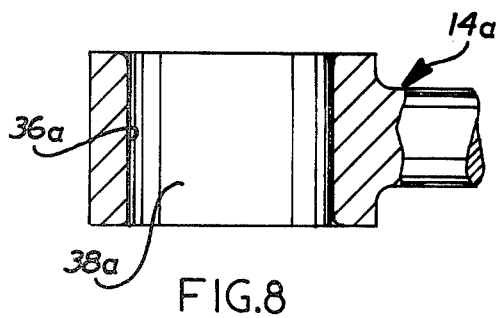
FIG.8
FIG.9
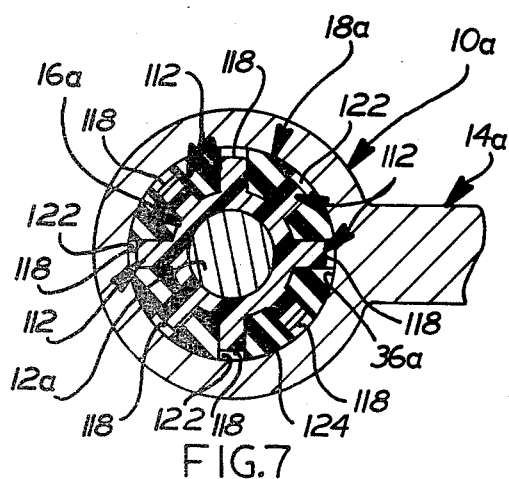
FIG.7
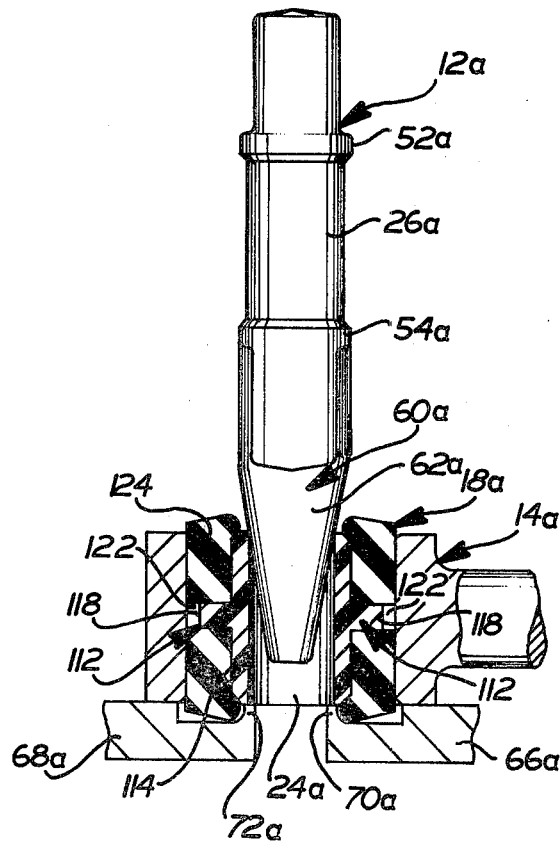

PIVOT JOINT

This is a continuation of application Ser. No. 837,395 filed Sept. 28, 1977.

BACKGROUND OF THE INVENTION

This invention relates generally to a pivot joint and more specifically to a pivot joint having a bearing which is circumferentially stressed in tension to apply a rotational preload force against a stud.

A known pivot joint is disclosed in U.S. Pat. No. 1,909,100. This pivot joint includes a plurality of separate bearing segments which are bonded to a rubber bushing. Each of the bearing segments forms a portion of a circle with a space between adjacent bearing segments so that they do not engage the circular outer surface of the stud throughout its circumferential extent. The preload applied to the stud by the bearing segments is the result of compressing the rubber bushing between the bearing segments and a housing. Therefore both the rotational and tilting preload forces applied to the stud are dependent upon the extent to which the resilient bushing is compressed. This impedes designing of a pivot joint having a desired rotational preload force and a desired sidewise tilting preload force since the two forces are interdependent.

Other known pivot joints are disclosed in U.S. Pat. Nos. 1,827,267; 1,871,918; 1,939,444; 1,954,277; 2,198,780; and 2,312,516. However, none of these patents disclose a pivot joint in which a bearing is circumferentially stressed in tension to apply a rotational preload force to a stud independently of the tilting preload force applied to the stud.

SUMMARY OF THE PRESENT INVENTION

The present invention provides a pivot joint in which a rotational preload force is applied to a stud by a bearing and a tilting preload force is applied to the stud by a bushing. The bearing is circumferentially stressed in tension and applies a clamping force to the stud. This clamping force holds the stud against rotational movement until a predetermined minimum rotational force has been applied to the stud. The bushing is disposed between the bearing and the housing to apply a tilting preload force to the stud. The bushing is formed of a resilient material and is compressed by sidewise tilting movement of the stud.

In accordance with a feature of the invention, the improved pivot joint is made by resiliently expanding the bearing and then gripping a portion of the stud with the expanded bearing. To enable the bearing to grip the stud at a location between a pair of relatively large diameter locating surfaces on the stud, the bearing is first over-expanded. The bearing and stud are then moved into alignment. As the stud and bearing move into alignment, the over-expanded bearing contracts somewhat to grip a portion of the stud between the locating surfaces. However, the bearing does not contract back to its original unrestrained size and is effective to grip the stud under the influence of tension stresses in the bearing.

Accordingly, it is an object of this invention to provide a new and improved pivot joint having a bearing which is circumferentially stressed in tension to provide a preload force which resists rotation of a stud relative to the bearing.

Another object of this invention is to provide a new and improved method of assembling a pivot joint by resiliently expanding a bearing and then gripping a portion of a stud with the bearing.

Another object of this invention is to provide a new and improved method of applying rotational preload forces to a pivot joint by gripping a stud under the influence of circumferential tension stresses in a bearing and applying tilting preload forces to the stud by compressing a bushing between the bearing and a housing.

BRIEF DESCRIPTION OF THE DRAWINGS

The foregoing and other objects and features of the present invention will become more apparent upon a consideration of the following description taken in connection with the accompanying drawings wherein:

FIG. 5 is a schematic illustration depicting the forces on a portion of the bearing;

FIG. 6 is a sectional view, generally similar to FIG. 1, of a second embodiment of the invention;

FIG. 7 is a sectional view, taken generally along the line 7—7 of FIG. 6, further illustrating the construction of the second embodiment of the pivot joint;

FIG. 8 is an exploded sectional view partially illustrating the manner in which the pivot joint of FIG. 6 is assembled; and FIG. 9 is a sectional view, generally similar to FIG. 4, illustrating the manner in which the bearing is resiliently expanded by a tapered tool to receive a stud.

DESCRIPTION OF SPECIFIC PREFERRED EMBODIMENTS OF THE INVENTION

Figure 1:
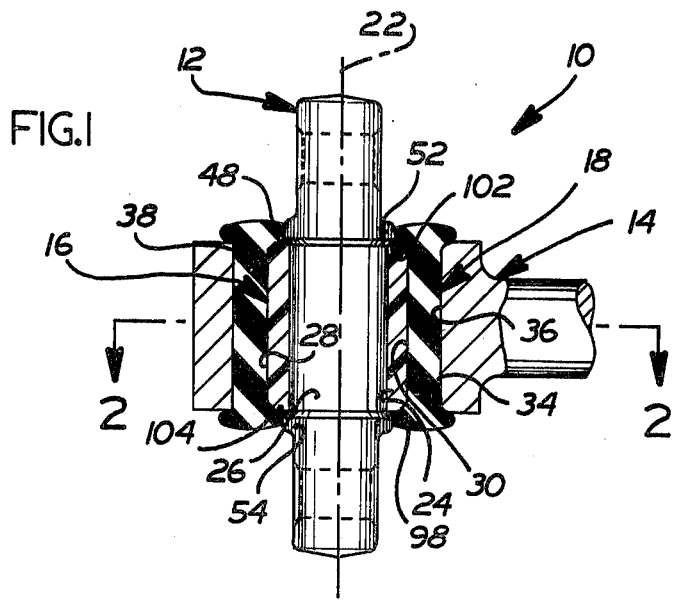
FIG. 1 is a sectional view of a pivot joint constructed in accordance with the present invention.

A pivot joint 10 constructed in accordance with the present invention is illustrated in FIG. 1. The pivot joint 10 includes a stud 12 which is preloaded against rotation relative to a housing 14 by a bearing 16. Stud 12 is preloaded against sidewise tilting movement relative to the housing 14 by a bushing 18. Although the pivot joint 10 has been shown in connection with a straddle mounting type stud 12, the present invention can be utilized in association with various other types of pivot joints. The invention can also be encapsulated to be inserted in various types of housings such as stamped, forged, cast steel, aluminum and prefabricated mounting arms.

Figure 2:
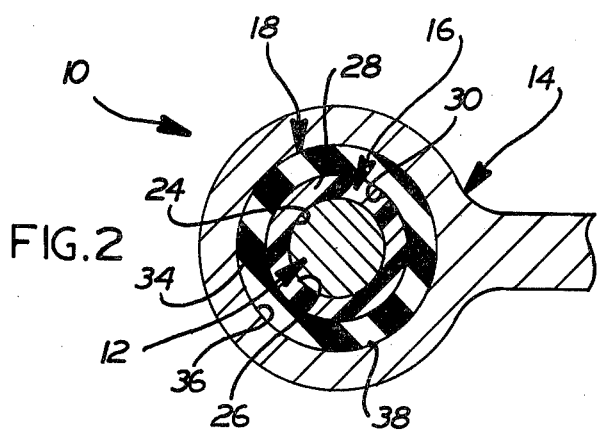
FIG. 2 is a sectional view, taken along the line 2—2 of FIG. 1, further illustrating the construction of the pivot joint.

In accordance with a feature of the present invention, the bearing 16 is circumferentially stressed in tension to provide a rotational preload force. This preload force causes the bearing 16 to hold the stud 12 against rotational movement about its central axis 22 until a predetermined minimum rotational force has been applied to the stud. The circumferential tension forces in the bearing 16 cause a cylindrical inner surface 24 (see FIG. 2) of the bearing to firmly grip a cylindrical outer surface 26 of the stud 12. The bearing 16 is held against rotational movement relative to the housing 14 by friction forces between a cylindrical outer surface 28 of the bearing and a cylindrical inner surface 30 of the bushing 18. If desired, the bearing 16 could be bonded to the bushing 18. In addition, suitable grooves for trapping lubricant can be formed in the inner surface 24 of the bearing 16.

In accordance with another feature of the present invention, the stud 12 is preloaded against sidewise tilting movement independently of the rotational preload force applied to the stud. Accordingly, the resiliently bushing 18 is compressed between the bearing 16 and the housing 14 to provide a tilting preload force. This preload force holds the stud in the upright orientation of FIG. 1 until a predetermined minimum tilting force is applied to the stud. The compressed bushing 18 is held against rotational movement relative to the housing 14 by friction forces between a cylindrical outer side surface 34 of the bushing and a cylindrical inner side surface 36 of the housing 14. If desired, the bushing 18 could be bonded to the housing 14.

Since the rotational preload forces are applied to the stud 12 by the bearing 16 and the tilting preload forces are applied to the stud by the bushing 18, the two preload forces are independently variable. This enables the bearing 16 and bushing 18 to be designed to provide optimum preload forces.

Figure 3:
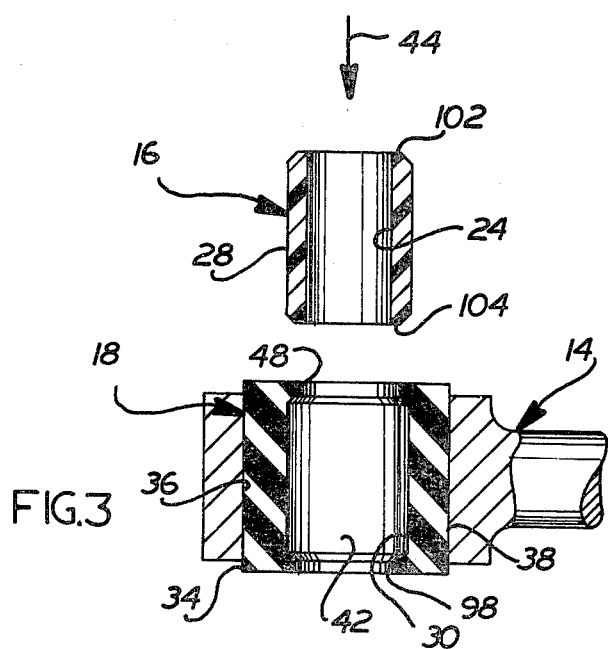
FIG. 3 is a partially exploded sectional view illustrating the manner in which a bushing is disposed in a housing and a bearing is moved into the bushing during assembly of the pivot joint of FIG. 1.

The pivot joint 10 is assembled by first positioning the resiliently deflectable bushing 18, which is formed of rubber or a similar elastomeric material, in a cylindrical chamber 38 formed in the housing 14 (see FIG. 3). The diameter of the outer surface 34 of the resilient bushing 18 is slightly greater than the diameter of the surface 36 of the housing chamber. Therefore, the bushing 18 is slightly compressed as it is positioned in the housing 14. The resulting frictional forces between the outer surface 34 of the bushing 18 and the inner surface 36 of the housing 14 hold the bushing in place.

The cylindrical bearing 16 is then inserted into a cylindrical chamber or cavity 42 formed in the bushing 18. To accomplish this, the bearing 16 is moved into axial alignment with the cavity 42. The bearing 16 is then moved downwardly (as viewed in FIG. 3) in the direction of the arrow 44. The outer side surface 28 of the bearing 16 has a somewhat larger diameter than the diameter of the inner side surface 30 of the bushing 18. Therefore, after the bearing 16 has moved past an inwardly projecting annular lip 48 formed at one end of the bushing 18, the bushing is further compressed radially outwardly against the side surface 36 of the housing 14.

After the bearing 16 has been positioned in the housing 18, the stud 12 is positioned in the bearing. The cylindrical inner side surface 24 of the bearing has an initial or unrestrained diameter which in less than the diameter of the cylindrical outer surface 26 of the stud. Before the stud 12 can be positioned in the bearing 16, the bearing must be expanded radially outwardly from the relatively small inside diameter shown in FIG. 3 to the larger diameter shown in FIGS. 1 and 2. This results in the introduction of circumferential tension stresses in the bearing 16 so that it resiliently grips the cylindrical side surface 26 of the stud to apply a rotational preload force to the stud.

In the illustrated embodiment of the invention, the stud 12 is provided with a pair of annular locating sections 52 and 54 (see FIG. 1) which limit axial movement of the bearing 16. Therefore, in order to insert the stud 12 into the bearing, the bearing must be resiliently expanded from the relatively small inside diameter shown in FIG. 3 to a relatively large inside diameter to enable a locating section 52 or 54 on the stud 12 to move through the bearing 16. When the bearing is aligned with the cylindrical surface 26, it is resiliently contracted to an inside diameter which is less than the diameter of the locating sections 52 and 54 and greater than the initial or unrestrained inside diameter of the bearing. This results in the bearing being stressed in tension so that it applies a radially inwardly directly clamping force against the cylindrical surface 26 of the stud to preload the stud against rotational movement relative to the housing 14.

Figure 4:
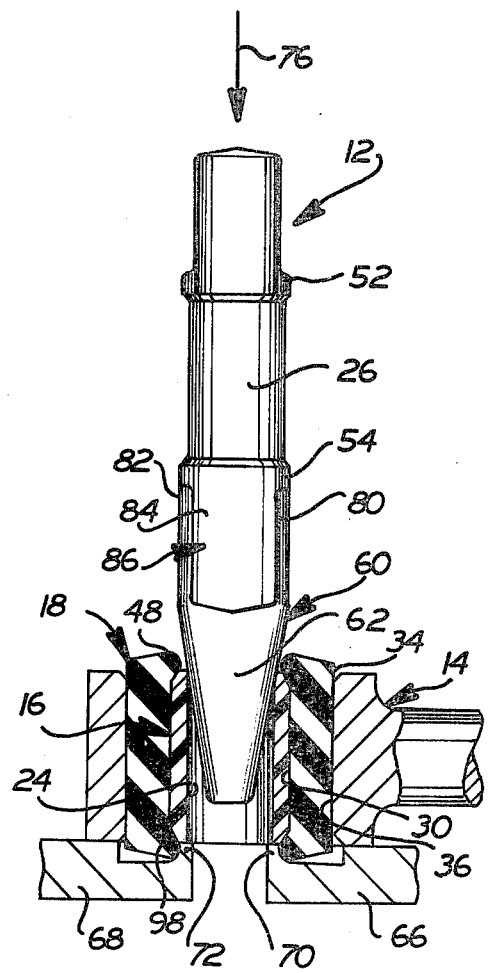
FIG. 4 is a fragmentary sectional view illustrating the manner in which the bearing is resiliently expanded by a tapered tool to enable a stud to be positioned within the bearing.

The bearing 16 is advantageously expanded accept the stud 12 through the use of a tapered assembly tool 60 (see FIG. 4). The tool 60 has a conical leading end or nose portion 62 which is positioned in an open end of the bearing 16. The bearing 16 is held against axial movement relative to the housing 14 by a pair of relatively movable support plates 66 and 68. The support plates 66 and 68 have semicircular end portions 70 and 72 which abut the lower end of the bearing 16. In addition, the support plates 66 and 68 engage the bottom of the housing 14.

As the tapered tool 60 and stud 12 are moved downwardly together (in the direction of the arrow 76 in FIG. 4), the conical leading end portion 62 of the tool 60 resiliently expands the bearing 16 radially outwardly and further compresses the bushing 18 between the bearing and the housing. The tool 60 has a pair of arcuate trailing end sections 80 and 82 which cooperate with an arcuate outer side surface 84 of a mounting section 86 of the stud 12 to form a cylinder having the same diameter as the outside surface of the locating section 54. Therefore, as the telescopic relationship between the bearing 16 and the tool 60 increases, the bearing is elastically expanded so that the inside surface 24 of the bearing has the same diameter as the outside surface of the locating section 54. It should be noted that as the bearing 16 is expanded radially outwardly by the tool 60, the support plates 66 and 68 are separated slightly so that the end portions 70 and 72 of the support plates remain in abutting engagement with the end of the bearing 19 to support the bearing.

Since the bearing 16 is elastically expanded from the relatively small inside diameter of FIG. 3 to an inside diameter which is the same as the outside diameter of the locating section 54, the bearing resiliently contracts to grip the cylindrical stud surface 26. The stud surface 26 has a diameter which is greater than the initial inside diameter of the bearing 16. This results in the introduction of uniform circumferential tension stresses or hoop stresses in the bearing 16. These stresses cause the bearing to resiliently grip the stud 12 with a clamping force which preloads the stud against rotational movement relative to the housing 14.

The forces in a portion of the bearing 16 are illustrated schematically in FIG. 5. Thus, the cylindrical side surface 26 of the stud 12 is effective to apply uniform radially outwardly directed forces against the inside surface 24 of the bearing 16 in the manner indicated schematically by the arrows 90 in FIG. 5. This results in hoop tension forces 94 being introduced in the bearing 16 to circumferentially stress the bearing. Although only the outwardly directed forces 90 applied against the inside surface of the bearing 24 have been illustrated in FIG. 5, it should be understood that similar forces are applied against the outside surface 26 of the stud 12 by the bearing 16 to firmly grip the stud and preload it against rotational movement.

The magnitude of the rotational preload force can be varied by varying the relationship between the initial inside diameter of the bearing 16 and the outside diameter of the surface 26 of the stud 12. Thus, if a greater rotational preload force is desired, it is merely necessary to form the bearing 16 with a somewhat smaller initial inside diameter. The rotational preload forces could also be adjusted by varying the material from which the bearing 16 is formed. However, it is contemplated that the bearing will be formed of a suitable polyethylene having the necessary resilience to elastically expand and then contract to grip the stud 12. The preload force applied to the stud could be changed by utilizing a polyethylene having a different tensile strength.

The bushing 18 applies a sidewise tilting preload force to the stud 12. The tilting preload force is independent of the rotational preload force applied to the stud 12. This is because the rotational preload force is applied by the resilient gripping engagement between the bearing 16 and the stud 12 and is not determined by the extent to which the bushing 18 is compressed. Therefore, the sidewise tilting preload applied to the stud 12 can be adjusted by varying the extent to which the bushing 18 is compressed in the housing 14. This can be accomplished by varying the inside diameter of the opening 42 in the bushing or by varying the outside diameter of the bushing. Of course the sidewise tilting preload force could be varied by changing the material from which the bushing 18 is formed.

The annular lip 48 at one end of the bushing 18 and a corresponding annular lip 98 (see FIG. 3) at the opposite end of the bushing extend over annular end surfaces 102 and 104 at opposite ends of the bearing 16. The annular bushing lips 48 and 98 are disposed in sealing engagement with the locating sections 52 and 54 (see FIG. 1) on the stud 12 to block the entry of dirt and other foreign materials into the pivot joint 10.

In the embodiment of the invention illustrated in FIGS. 1-5, the stud 12 of the pivot joint 10 is restrained against sidewise movement by only the bushing 18. This requires that the bushing 18 be of sufficient hardness to withstand the maximum sidewise tilting loads applied to the stud. In the embodiment of the invention illustrated in FIGS. 6-9, maximum sidewise tilting movement of the stud is limited by engagement of the bearing with the housing. When this occurs, loads are transmitted directly to the housing through the bearing. Since the embodiment of the invention illustrated in FIGS. 6-9 has many components which are similar to the components of the embodiment of the invention illustrated in FIGS. 1-5, similar numerals will be utilized to designate similar components, the suffix letter "a" being associated with the numerals of FIGS. 6-9 to avoid confusion.

A pivot joint 10a (FIGS. 6 and 7) includes a stud 12a which is received in a housing 14a. A bearing 16a applies a rotational preload force to the stud 12a. A bushing 18a is compressed between the bearing 16a and the housing 14a. The bushing 18a is effective to provide a preload force holding the stud 12 against sidewise tilting movement relative to the housing.

In accordance with a feature of this embodiment of the invention, the bearing 16a has a plurality of protuberances or projections 112 (see FIGS. 6 and 7) which extend radially outwardly from a cylindrical main wall 114 of the bearing. Each of the projections 112 has an end surface 118 which is spaced a predetermined distance from the cylindrical inner surface 36a of the housing 14a (see FIGS. 6-8). The space between the end surfaces 118 of the projections 112 and the housing surface 36a corresponds to the maximum permissible sidewise movement of the stud 12a.

When a sidewise or tilting force applied to the stud 12a exceeds a predetermined amount, the bushing 18a is compressed to such an extent that the end surface 118 on one or more of the projections 112 abuts the inner surface 36a of the housing 14a. When this occurs, the sidewise tilting movement applied to the stud 12a is transmitted directly from the bearing 16a to the housing 14a without further compressing the bushing 18a.

This enables the sidewise or tilting load carrying capability of the joint 10a to be maximized without providing a bushing 18a of sufficient strength to transmit the maximum sidewise or tilting loads. Therefore the bushing 18a can be made of a material which is relatively easily compressed to provide excellent low load shock dampening characteristics. This bushing material may be incapable of withstanding the maximum loads to be transmitted to the stud 12. If the bushing material had to be sufficiently strong to withstand the maximum tilting loads, it would be formed of a relatively hard material with a resulting sacrifice in low load shock dampening capabilities.

In the embodiment of the invention illustrated in FIGS. 6-9 the projections 112 extend radially outwardly from a central portion of the bearing 16a. However, it is contemplated that the projections 112 could, if desired, be disposed at other locations on the wall 114 of the bearing. For example, it is contemplated that projections could be provided at opposite axial ends of the bearing wall 114. It is also contemplated that the projections 112 could have a configuration other than the specific configuration illustrated in the drawings.

The bearing 16a is stressed in tension to provide a rotational preload clamping or gripping action against the cylindrical surface 26a of the stud 12a. When the pivot joint 10a is being assembled, the bearing 16a is first disposed in the bushing 18a with the projections 112 extending through radial openings 122 formed in a cylindrical wall 124 of the bushing 18a (see FIGS. 8 and 9). Once the bearing 16a has been disposed in the bushing 18a with the projections 112 extending through the openings 122, the bearing and bushing are positioned in the housing 14a (see FIG. 9).

A tapered expanding tool 60a (FIG. 9) is utilized to resiliently expand the bearing 16a in the manner previously explained in connection with the embodiment of the invention shown in FIGS. 1-5. Once the bearing 16a has been over-expanded and then allowed to resiliently contract to grip the cylindrical surface 26a of the stud 12a, the bearing is stressed in tension and is effective to apply a rotational preload force to the stud which is independent of the sidewise tilting preload force applied to the stud by the bushing 18a. It should be noted that as the tool 60a expands the bearing 16a, the end surfaces 118 on the projections 112 will move slightly closer to the cylindrical side surface 36a of the housing 14a . Of course, bearing 16a was originally formed in the unrestrained condition of FIG. 8 with the stop surfaces 118 on the projections 112 slightly inwardly from their final positions shown in FIGS. 6 and 7 to accommodate the radial expansion of the bearing 16a.

Since the projections 112 on the bearing 16a extend into the openings 122 on the bushing 18a, the projections cooperate with the bushing to prevent relative rotation between the bearing and the bushing. It is believed that this feature will be particularly advantageous when the bushing 18a is compressed to only a relatively small extent to provide a relatively small sidewise or tilting preload force on the stud 12a. Although with such a construction the bushing 18a is effective to only apply a small preload force, the joint 10a can withstand relatively large sidewise or tilting forces since these forces are transmitted directly to the housing 14a by the projections 112 on the bearing 16a.

In view of the foregoing description it is apparent that the present invention provides pivot joints 10 and 10a in which rotational preload forces are applied to studs 12 and 12a by bearings 16 and 16a. Tilting preload forces are applied to the studs 12 and 12a by bushings 18 and 18a. The bearings 16 and 16a are circumferentially stressed in tension and apply clamping forces to the studs. These clamping forces hold the studs 12 and 12a against rotational movement until predetermined minimum rotational forces have been applied to the studs. The bushings 18 and 18a are disposed between the bearings 16 and 16a and the housings 14 and 14a to apply tilting preload forces to the studs. The bushings are formed of a resilient material and are compressed by sidewise tilting movement of the studs.

In accordance with a feature of the invention, the improved pivot joints 12 and 12a are made by resiliently expanding the bearings 16 and 16a and then gripping the studs with the expanded bearings. To enable the bearings 16 and 16a to grip the studs at locations between relatively large diameter locating surfaces on the studs, the bearings are first over-expanded. The bearings and studs are then moved into alignment. As the studs and bearings move into alignment, the over-expanded bearings contract somewhat to grip the studs between the locating surfaces. However, the bearings 16 and 16a do not contract back to their original unrestrained sizes and are effective to grip the studs 12 and 12a under the influence of tension stresses in the bearings.

It is contemplated that pivot joints constructed in accordance with the present invention will be utilized in many different environments. For example, the pivot joints 10 or 10a could be used in association with torque or radius rods for commercial vehicles, track bars for front or rear vehicle suspension systems, rear suspension control arms for passenger cars, steering system components for all types of vehicles and for other industrial applications. The bearing and bushing materials can be varied to produce the desired friction, expansion and compression characteristics. In the embodiment of the invention illustrated in FIGS. 6-9, the number of projections 112 and their circumferential axial extent can be varied to provide the desired maximum load capacity.

Having described specific preferred embodiments of the invention, the following is claimed:

1. A pivot joint comprising a housing at least partially defining a chamber, a tiltable and rotatable stud extending into said chamber, a resilient bushing at least partially disposed in said chamber and circumscribing said stud to hold said stud against sidewise tilting movement, said bushing being resiliently compressible to enable said stud to be moved sideways against the influence of said bushing, and a bearing disposed between said stud and bushing and circumferentially stressed in tension by said stud to provide a preload force resisting rotation of said stud relative to said bearing, said bearing having stop means for engaging said housing to limit sidewise tilting movement of said stud.

2. A pivot joint as set forth in claim 1 wherein said bushing has a first axial end portion disposed adjacent to a first end of said bearing and a second axial end portion disposed adjacent to a second end of said bearing, said stop means being disposed at a location between the first and second end portions of said bushing.

3. A pivot joint as set forth in claim 1 wherein said bushing includes surface means for defining a plurality of openings, said stop means including a plurality of projections which extend into the openings in said bushing, each of said projections having surface means for engaging said housing to limit sidewise tilting movement of said stud.

4. A pivot joint as set forth in claim 1 wherein said stud has a cylindrical outer surface area with a first diameter, said bearing having a cylindrical inner surface area which has a second diameter when said bearing is in an unrestrained condition, said first diameter being larger than said second diameter, said cylindrical inner surface area of said bearing being disposed in abutting engagement with said cylindrical outer surface of said stud to effect circumferential stressing of said bearing in tension.

5. A pivot joint as set forth in claim 1 wherein said stop means includes means for holding said bushing against rotation relative to said housing and means for holding said bearing against rotation relative to said bushing.

6. A pivot joint as set forth in claim 1 wherein said bushing includes means for sealingly engaging said stud adjacent to opposite ends of said bearing to prevent foreign materials from entering between said bearing and said stud.

7. A pivot joint as set forth in claim 1 wherein said bearing has a generally cylindrical sidewall and said stop means extend radially outwardly from said sidewall to engage said housing to limit sidewise tilting movement of said stud.

8. A pivot joint as set forth in claim 7 wherein said resilient bushing is compressed between said bearing and said housing to provide a preload force resisting tilting movement of said stud.

9. A pivot joint comprising a housing at least partially defining a chamber, a one piece tiltable and rotatable stud extending into said chamber, said stud having a cylindrical bearing section and a pair of cylindrical locating sections integrally formed with said bearing section and disposed at opposite end portions of said bearing section, said cylindrical bearing section having an outside diameter which is less than the outside diameters of said locating sections, a resilient bushing at least partially disposed in said chamber and circumscribing said stud to hold said stud against sidewise tilting movement, and a bearing disposed between said stud and said bushing and circumferentially stressed in tension by said stud to provide a preload force resisting rotation of said stud relative to said bearing, said bearing having a cylindrical inner surface which has an initial unrestrained inside diameter which is less than the outside diameter of said bearing section of said stud, said cylindrical inner surface of said bearing being disposed in abutting engagement with said bearing section of said stud to resiliently deform said bearing and maintain the inside diameter of said cylindrical inner surface equal to the outside diameter of said bearing section of said stud, said locating sections of said stud being disposed in engagement with opposite ends of said bearing to retard axial movement of said bearing.

10. A pivot joint as set forth in claim 9 wherein said bearing has stop means for engaging said housing to limit sidewise tilting movement of said stud.

11. A pivot joint as set forth in claim 9 wherein said bushing has a first axial end portion disposed adjacent to a first end of said bearing and a second axial end portion disposed adjacent to a second end of said bearing, said bearing having stop means for engaging said housing at a location between the first and second end portions of said bushing to limit sidewise tilting movement of said stud.

12. A pivot joint as set forth in claim 9 wherein said bushing includes surface means for defining a plurality of openings, said bearing having a plurality of projections which extend into the openings in said bushing, each of said projections having surface means for engaging said housing to limit sidewise tilting movement of said stud.

13. A pivot joint as set forth in claim 9 wherein said bushing includes means for sealingly engaging said stud adjacent to opposite ends of said beraing to prevent foreign materials from entering between said bearing and said stud.

* * * * *